United States Patent [19]

Engel et al.

[11] Patent Number: 5,907,830

[45] Date of Patent: May 25, 1999

[54] ELECTRONIC COUPON DISTRIBUTION

[76] Inventors: Peter Engel, 144 N. Robertson Blvd., Los Angeles, Calif. 90048-3102; Andrew Engel, 2392 Camino Capitan #4D, Santa Fe, N.M. 87505

[21] Appl. No.: 08/600,751

[22] Filed: Feb. 13, 1996

[51] Int. Cl.$^6$ .................................................... B42D 15/02
[52] U.S. Cl. .................................................................. 705/14
[58] Field of Search .............................. 705/14; 395/761, 395/214, 148; 463/40

[56] References Cited

U.S. PATENT DOCUMENTS

| | | | |
|---|---|---|---|
| 5,557,721 | 9/1996 | Fite et al. ................................... | 395/148 |
| 5,697,844 | 12/1997 | Von Kohorn ............................... | 463/40 |
| 5,708,782 | 1/1998 | Larson et al. ............................. | 395/214 |
| 5,710,886 | 1/1998 | Christensen et al. .................... | 395/214 |
| 5,737,619 | 4/1998 | Judson ...................................... | 395/761 |
| 5,761,648 | 6/1998 | Golden et al. ............................ | 705/14 |
| 5,774,869 | 6/1998 | Toader ...................................... | 705/10 |

OTHER PUBLICATIONS

Michael Wilke, "Catalina, Coupons Online in tests", Aug. 28, 1995, p. 15, Advertising Age.

*Primary Examiner*—Kevin J. Teska
*Assistant Examiner*—Dan Fiul
*Attorney, Agent, or Firm*—Fattibene & Fattibene; Arthur T. Fattibene; Paul A. Fattibene

[57] ABSTRACT

An electronic coupon distribution system providing on-line coupon information for a potential consumer using a personal computer connected to a host computer. A potential consumer using a personal computer and a modem connects to a host computer via the Internet or directly. The potential consumer may specify product preferences or search and view coupons of interest to the consumer. The consumer may then download from the host computer coupon information that may be printed on the potential consumer's printer connected to his personal computer. Information identifying the downloaded coupon is coded or encrypted onto the printed coupon to prevent unauthorized reproduction. The coupon distribution system may be used to obtain additional information about the potential consumer for future marketing purposes. The present invention greatly facilitates and makes economical distribution of coupons or certificates.

6 Claims, 2 Drawing Sheets

ELECTRONIC COUPON DISTRIBUTION

FIELD OF THE INVENTION

The present invention relates generally to the distribution of manufacturers' coupons for redemption by the consumer, and more particularly to the distribution of coupons by on-line sources.

BACKGROUND OF THE INVENTION

Paper coupons have been distributed to potential consumers who redeem the coupon upon purchasing a product or service. The coupon generally provides a discount for the product or service purchased by the consumer. Paper coupons are generally found in magazines, newspapers, and direct mailings to potential consumers. Paper coupons are costly to print and distribute. Additionally, many of the paper coupons distributed may never be seen or used by a consumer. Many of the coupons received by a potential consumer may be of no interest to that particular consumer. Therefore, there is a need for an alternative distribution system or method that will be more economical and be directed to a potential consumer with an interest in the product or service for which the coupon is to be redeemed.

SUMMARY OF THE INVENTION

The present invention is an apparatus and method for electronically distributing coupons or certificates to potential consumers for redemption. A host computer contains information relating to available coupons. A potential customer or a client uses a personal computer to connect to the host computer. The potential consumer may download electronically a desired coupon. The downloaded coupon is printed out on the potential consumer's printer. In one embodiment, the coupon printed from the downloaded information is encoded for identification and to prevent unauthorized duplication of coupons. In another embodiment, information obtained from the potential consumer is maintained in the host computer and used for marketing purposes in identifying potential customers for different products.

Accordingly, it is an object of the present invention to more efficiently distribute coupons.

It is another object of the present invention to obtain consumer information for marketing purposes.

It is an advantage of the present invention that the potential consumer only receives coupons that have been specifically identified.

It is a further advantage of the present invention that coupons may readily be updated or changed and even personalized.

It is a feature of the present invention that the distribution of the coupons is controlled by printing identifying indicia on the coupon.

It is a feature of the present invention that access to coupons may be obtained by any on-line service such as the Internet.

These and other objects, advantages, and features will become apparent in view of the following more detailed description.

DETAILED DESCRIPTION OF THE PREFERRED EMBODIMENTS

Figure 1:
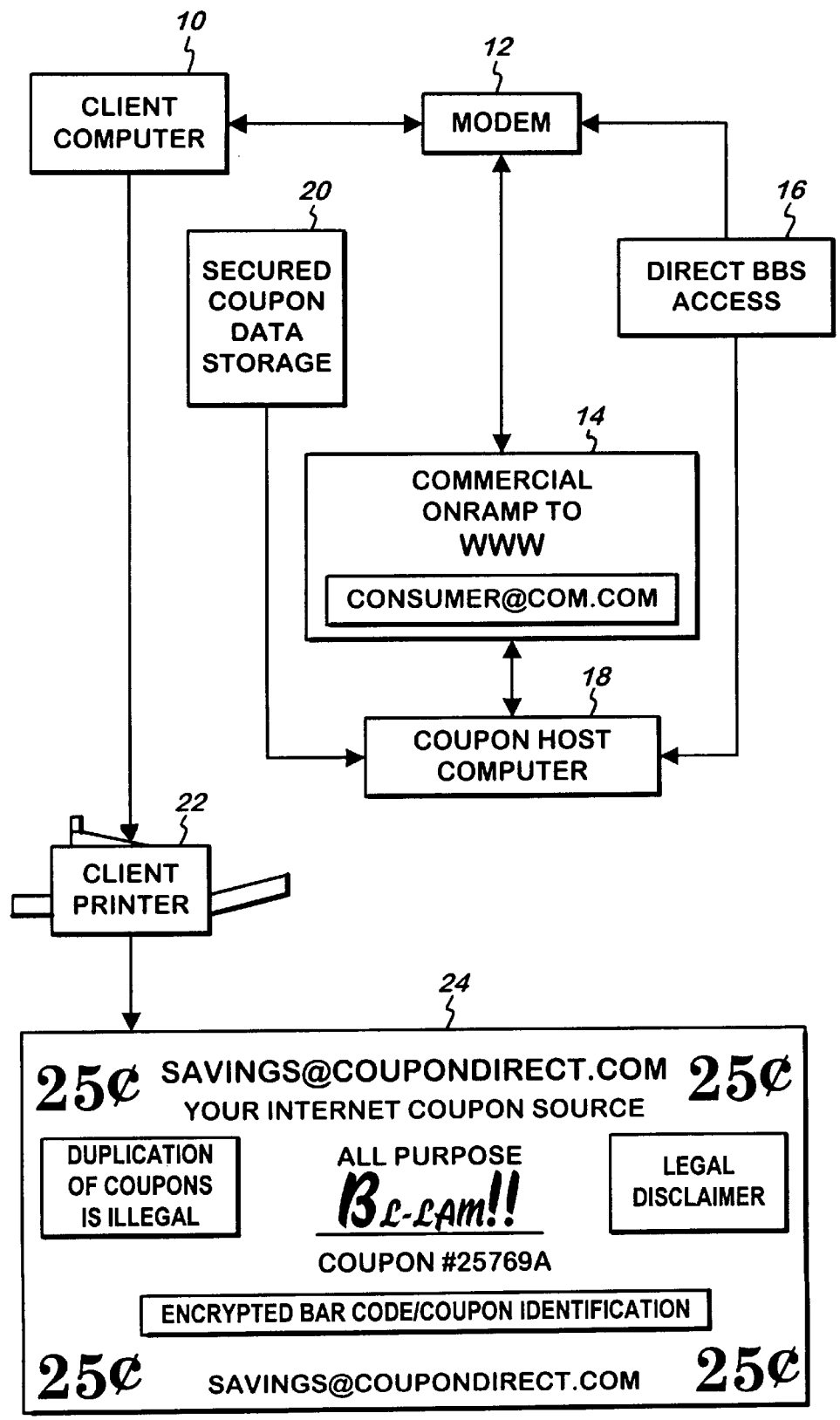
FIG. 1 is a block diagram illustrating the present invention.

FIG. 1 generally illustrates the present invention. In FIG. 1, a personal computer or a client computer 10 is connected to a host computer 18 containing coupon information. The client computer 10 is preferably connected by modem 12 to a commercial service 14 for accessing a network, such as the Internet, or by direct access 16 from a bulletin board system. The host computer 18 contains a secured coupon data storage area 20. The personal or client computer 10 is connected to a printer 22 for printing a coupon 24. The coupon 24 has encoded thereon indicia for identifying the coupon. This may be accomplished with an encrypted bar code. The coupon identification may incorporate the client computer's 10 address and the date to prevent unauthorized duplication. In the coupon distribution system illustrated in FIG. 1, a potential consumer using the personal computer or client computer 10 can connect to a host computer 18 to view available coupons. The term coupon is intended to mean any paper certificate used to obtain anything of interest to a potential consumer, such as special pricing, a discount, money, additional product, premiums, rebates, or any other item or thing of value or interest. If the Internet is used to obtain a connection to the host computer 18, a home page may be created using hypertext mark up language (HTML) to access both textual and graphic representations of the coupons and/or certificates. Once the potential consumer identifies the coupon or certificate on the host computer 18, the potential consumer downloads the information required to print the coupon or certificate 24. The coupon data storage 20, associated with the host computer 18, is secured to prevent unauthorized tampering with the available coupon data.

The coupons printed from the downloaded information obtained from the host computer 18 may be bar coded with identifying information containing the address of the client computer 10 and the date of the downloading of the information from the host computer 18. The bar coding may be encrypted by a random algorithm. The address information and date may also be printed on the coupon without any encryption to discourage attempts to reproduce the coupon without authority. Additionally, proprietary symbols may be used on the coupons as well as special fonts that are not widely available to further discourage unauthorized reproduction of the coupons.

Figure 2:
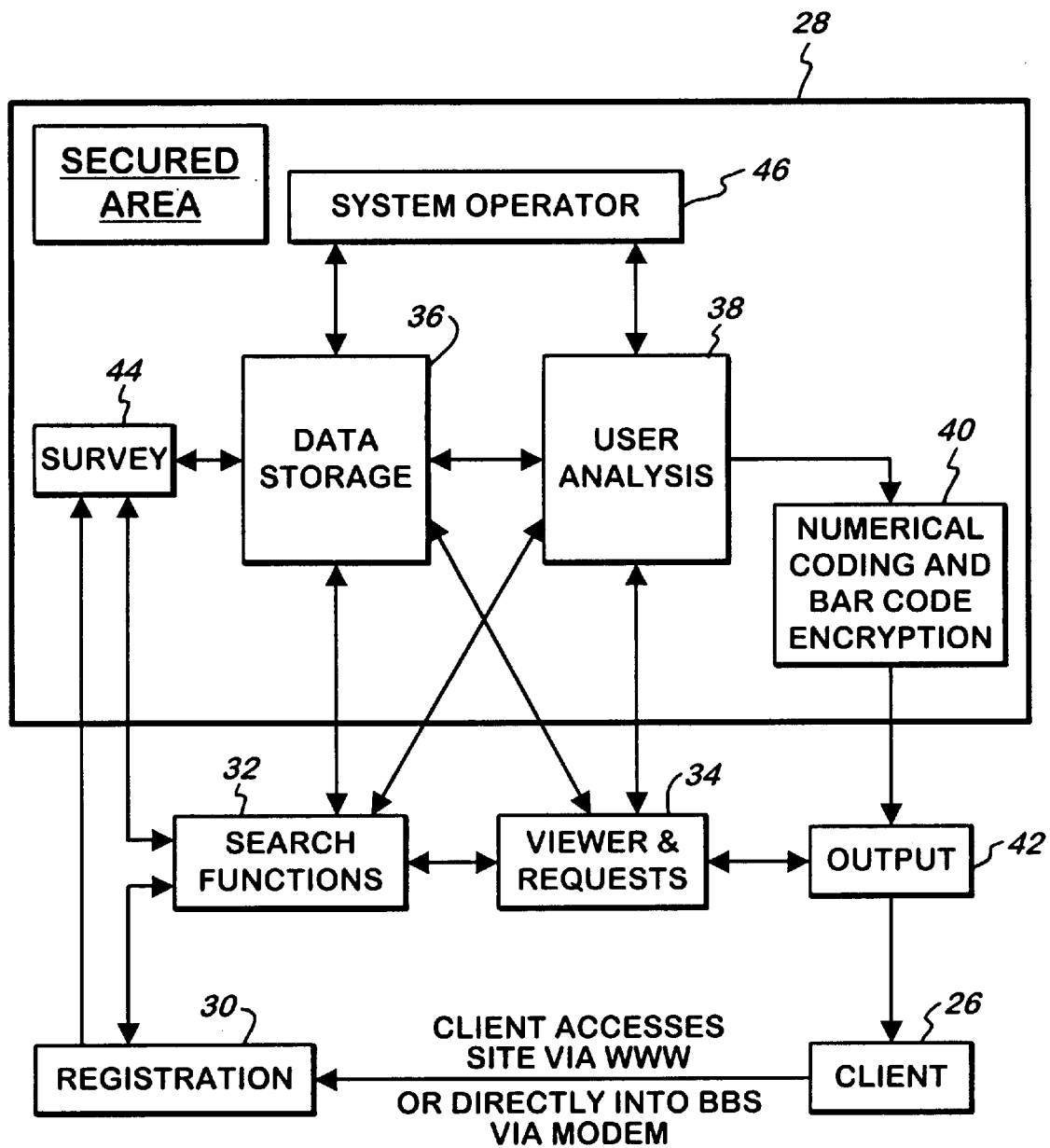
FIG. 2 is a flow chart illustrating the present invention.

FIG. 2 generally illustrates the different functions and their interrelationship for the coupon distribution system of the present invention. The client 26 using a computer accesses the host system 28 either via the worldwide web on the Internet or directly to a bulletin board system. The client 26 provides information to the host system 28 by a registration process 30. Once registered, the client 26 may access search functions 32 having access to data storage 36 and user analysis 38 of the host system 28. The search functions 32 are also coupled to a viewer and request function 34. The viewer and request function 34 has access to the data storage 36 and the user analysis 38. The viewer and request 34 permits the client 26 to view or request selected coupons. After the client 26 has searched for and made a request, the user analysis 38 having coupon information is coupled to numerical coding and bar code encryption 40, which in turn is connected to output 42 for eventual downloading to the client 26. The client 26 may then print out the coupon as illustrated in FIG. 1. The host system 28 may also be used to provide information for a survey 44. The survey 44 may provide information particular to the customer or client 26. The host system 28 is operated by a system operator 46 which is coupled to the data storage 36 and the user analysis 38. The functions of the host system 28 are all located in a secured area. This prevents any unauthorized tampering with the host system 28.

With reference to FIGS. 1 and 2, it may be readily appreciated that in using the coupon distribution system of the present invention, the distribution of coupons and certificates including their retail redemption can be tracked and the data analyzed to create category specific consumer groups to be utilized in the marketing of products. Based on information encoded on the coupons and the site at which the coupons are redeemed, it is possible to map the buying habits and preferences of consumers. The mapping or tracking of redemptions may also be used to prevent unauthorized redemption. Additionally, by using information from the potential consumer and the requests consumers make for specific coupons and certificates, a mailing list may be compiled that is sorted into product preference groups. The present invention additionally makes possible, when a potential customer inputs information about preferences, to automatically direct coupons satisfying the potential consumer's preferences to the consumer when the coupons become available.

Accordingly, the present invention greatly facilitates the distribution of coupons or certificates and permits detailed tracking or mapping of a potential consumer's preferences. The tracking or mapping may then be used to specifically target potential customers.

While the present invention has been described with reference to several preferred embodiments, it should readily be appreciated by those skilled in the art that variations and modifications may be made without departing from the spirit and scope of this invention.

What is claimed is:

1. A coupon distribution system comprising:

a client computer accessible by a potential consumer;

a printer connected to said client computer;

a host computer, said host computer containing coupon information relating to available coupons being offered to the potential consumer for redemption upon purchasing a product;

a communication device connected between said client computer and said host computer whereby the coupon information may be downloaded to said client computer upon the potential consumer indicating an interest in the product without any pre-authorization, wherein said printer prints out a paper coupon based on the coupon information downloaded from said host computer; and identifying indicia identifying said client computer printed on the paper coupon.

2. A coupon distribution system as in claim 1 wherein: the identifying indicia is encrypted.

3. A coupon distribution system as in claim 1 wherein: the identifying indicia is a bar code.

4. An on-line coupon distribution system comprising:

a host computer;

a secured coupon data storage area within said host computer, said secured coupon data storage area containing information about available coupons which may be requested and downloaded;

a search function area within said host computer;

a viewer and request area within said host computer;

a survey area within said host computer;

a user analysis area within said host computer; and connection means, associated with said host computer and a client computer, for connecting said host computer to a client computer without any pre-authorization; and a printer coupled to the client computer whereby the potential consumer can print a desired coupon based on the downloaded coupon information, the desired printed coupon contains identifying indicia identifying the client computer, whereby a potential consumer using the client computer can connect to said host computer and download information about available coupons of interest.

5. An on-line coupon distribution system as in claim 4 wherein:

the identifying indicia is encrypted.

6. An on-line coupon distribution system comprising:

a client computer;

a printer coupled to said client computer;

a host computer;

a modem connected between said client computer and said host computer whereby coupon information may be downloaded to said client computer;

a secured coupon data storage area associated with said host computer, said secured coupon data storage area containing information on available coupons;

a survey area associated with said host computer, said survey area containing information related to consumer preferences;

a user analysis area associated with said host computer, said survey area, and said secured coupon data storage area;

a search function area associated with said host computer, said survey area, and said secured coupon data storage area;

a viewer and request area associated with said host computer, said search function, said survey area, and said secured coupon data storage area; and a numerical coding and encryption area associated with said host computer and said user analysis, said numerical coding and encryption area using identifying indicia of a potential consumer to code the identity of the potential consumer, the identifying indicia includes the address of said client computer and a date, wherein said printer prints out a paper coupon based on the coupon information downloaded from said host computer which is coded with the identifying indicia of the potential consumer for tracking purposes.

* * * * *